United States Patent
Lee

(10) Patent No.: US 10,240,807 B2
(45) Date of Patent: Mar. 26, 2019

(54) DESICCANT COOLING SYSTEM

(71) Applicant: KOREA INSTITUTE OF SCIENCE AND TECHNOLOGY, Seoul (KR)

(72) Inventor: Dae Young Lee, Seoul (KR)

(73) Assignee: KOREA INSTITUTE OF SCIENCE AND TECHNOLOGY, Seoul (KR)

( * ) Notice: Subject to any disclaimer, the term of this patent is extended or adjusted under 35 U.S.C. 154(b) by 464 days.

(21) Appl. No.: 14/944,342

(22) Filed: Nov. 18, 2015

(65) Prior Publication Data
US 2016/0146513 A1 May 26, 2016

(30) Foreign Application Priority Data
Nov. 24, 2014 (KR) .................. 10-2014-0164432

(51) Int. Cl.
| | | |
|---|---|---|
| *F25B 13/00* | (2006.01) | |
| *F24F 3/14* | (2006.01) | |
| *F24F 3/153* | (2006.01) | |
| *F24F 5/00* | (2006.01) | |

(52) U.S. Cl.
CPC ............ *F24F 3/1423* (2013.01); *F24F 3/153* (2013.01); *F24F 5/0035* (2013.01); *F24F 2003/1458* (2013.01); *F24F 2003/1464* (2013.01)

(58) Field of Classification Search
CPC ........ F24F 3/1423; F24F 5/0035; F24F 3/153; F24F 2003/1464; F24F 2003/1458
USPC .......................................................... 62/271
See application file for complete search history.

(56) References Cited

U.S. PATENT DOCUMENTS

| | | | | |
|---|---|---|---|---|
| 3,774,374 A | * | 11/1973 | Dufour | F24F 3/1423 126/99 R |
| 3,889,742 A | * | 6/1975 | Rush | F24D 11/007 96/144 |
| 4,014,380 A | * | 3/1977 | Rush | F24F 3/1423 165/236 |
| 4,171,620 A | * | 10/1979 | Turner | F24F 3/1417 62/79 |

(Continued)

FOREIGN PATENT DOCUMENTS

| | | |
|---|---|---|
| KR | 10-0773434 B1 | 11/2007 |
| KR | 10-0773435 B1 | 11/2007 |

(Continued)

OTHER PUBLICATIONS

Korean Office Action dated Jan. 6, 2016; Appln. No. 10-2014-0164432.

*Primary Examiner* — Ljiljana V. Ciric
*Assistant Examiner* — Kirstin U Oswald
(74) *Attorney, Agent, or Firm* — Ladas & Parry LLP

(57) ABSTRACT

A desiccant cooling system includes a desiccant cooler including a desiccant cooling path through which air introduced from the outside passes, a desiccant dehumidifier on the desiccant cooling path to pass through air and remove humidity of the air, and a water cooling portion cooling cooling water by using the low-humidity air that has passed through the desiccant dehumidifier; and a vapor compression cooling device including a water cooled condenser disposed to be cooled by the cooling water cooled by the water cooling portion so as to condense a refrigerant flowing inside the water cooled condenser, wherein the refrigerant is circulated in the water cooled condenser.

20 Claims, 8 Drawing Sheets

(56) References Cited

U.S. PATENT DOCUMENTS

| | | | | |
|---|---|---|---|---|
| 4,180,126 A * | 12/1979 | Rush | F24F 3/1423 | 165/59 |
| 4,180,985 A * | 1/1980 | Northrup, Jr. | B01D 53/26 | 62/271 |
| 4,594,860 A * | 6/1986 | Coellner | F24F 3/1423 | 165/10 |
| 4,729,774 A * | 3/1988 | Cohen | B01D 53/06 | 96/123 |
| 4,887,438 A * | 12/1989 | Meckler | F24D 5/12 | 62/271 |
| 4,905,479 A * | 3/1990 | Wilkinson | F24F 3/1417 | 165/103 |
| 4,910,971 A * | 3/1990 | McNab | F24F 3/044 | 62/310 |
| 4,926,618 A * | 5/1990 | Ratliff | B01D 53/06 | 95/10 |
| 4,941,324 A * | 7/1990 | Peterson | F24F 3/1411 | 62/271 |
| 4,984,434 A * | 1/1991 | Peterson | F24F 3/1411 | 62/271 |
| 5,170,633 A * | 12/1992 | Kaplan | F24F 3/1423 | 62/271 |
| 5,251,458 A * | 10/1993 | Tchernev | B01D 46/00 | 62/271 |
| 5,325,676 A * | 7/1994 | Meckler | F24F 3/06 | 62/271 |
| 5,353,606 A * | 10/1994 | Yoho | F24F 3/1423 | 62/271 |
| 5,373,704 A * | 12/1994 | McFadden | B01D 53/06 | 62/271 |
| 5,400,105 A * | 3/1995 | Koboshi | G03C 5/264 | 396/565 |
| 5,426,953 A * | 6/1995 | Meckler | F24F 3/1411 | 165/8 |
| 5,448,895 A * | 9/1995 | Coellner | F24F 3/1411 | 62/271 |
| 5,460,004 A * | 10/1995 | Tsimerman | B01D 53/261 | 62/271 |
| 5,471,852 A * | 12/1995 | Meckler | B01D 53/261 | 62/271 |
| 5,517,828 A * | 5/1996 | Calton | F24F 3/1411 | 62/271 |
| 5,551,245 A * | 9/1996 | Calton | F24F 3/1411 | 62/271 |
| 5,579,647 A * | 12/1996 | Calton | F24F 3/1411 | 62/223 |
| 5,580,369 A * | 12/1996 | Belding | B01D 53/261 | 162/164.2 |
| 5,660,048 A * | 8/1997 | Belding | B01D 53/06 | 165/7 |
| 5,732,562 A * | 3/1998 | Moratalla | B01D 53/265 | 165/7 |
| 5,758,511 A * | 6/1998 | Yoho | F24F 3/1411 | 62/271 |
| 5,782,104 A * | 7/1998 | Sami | B01D 53/261 | 62/238.1 |
| 5,860,284 A * | 1/1999 | Goland | F24F 3/1423 | 165/60 |
| 5,931,016 A * | 8/1999 | Yoho, Sr. | B01D 53/007 | 62/271 |
| 6,018,953 A * | 2/2000 | Belding | B01D 53/06 | 62/271 |
| 6,141,979 A * | 11/2000 | Dunlap | F24F 3/044 | 165/8 |
| 6,575,228 B1 * | 6/2003 | Ragland | F24F 3/1411 | 165/54 |
| 6,751,964 B2 * | 6/2004 | Fischer | F24F 3/1423 | 62/271 |
| RE39,288 E * | 9/2006 | Assaf | F24F 3/1411 | 62/271 |
| 7,428,821 B2 * | 9/2008 | Kashirajima | F24F 3/1423 | 62/271 |
| 8,790,451 B1 * | 7/2014 | Narayanamurthy | B01D 53/261 | 62/271 |
| 2003/0000230 A1 * | 1/2003 | Kopko | F24F 3/00 | 62/82 |
| 2003/0074913 A1 * | 4/2003 | Ebara | F24F 3/1423 | 62/271 |
| 2004/0000152 A1 * | 1/2004 | Fischer | F24F 3/1423 | 62/94 |
| 2005/0252229 A1 * | 11/2005 | Moratalla | B01D 53/26 | 62/271 |
| 2006/0201183 A1 * | 9/2006 | Otake | F24F 3/1423 | 62/271 |
| 2007/0163279 A1 * | 7/2007 | Moffitt | F24F 3/1423 | 62/271 |
| 2010/0154450 A1 | 6/2010 | Yoon et al. | | |
| 2010/0154455 A1 * | 6/2010 | Yoon | F24F 3/1423 | 62/271 |
| 2010/0154465 A1 | 6/2010 | Yoon et al. | | |
| 2010/0212345 A1 | 8/2010 | Yoon et al. | | |
| 2010/0242507 A1 * | 9/2010 | Meckler | F24F 3/1423 | 62/94 |
| 2010/0275775 A1 * | 11/2010 | Griffiths | B01D 53/0454 | 95/18 |
| 2013/0186118 A1 * | 7/2013 | Ohs | F24F 3/153 | 62/94 |
| 2013/0213079 A1 * | 8/2013 | Ito | F24F 3/1411 | 62/324.6 |
| 2015/0354839 A1 * | 12/2015 | Lee | F24F 5/001 | 62/271 |

FOREIGN PATENT DOCUMENTS

| | | |
|---|---|---|
| KR | 10-0780068 B1 | 11/2007 |
| KR | 100947616 B1 | 3/2010 |
| KR | 1020110092773 A | 8/2011 |
| KR | 20120121776 A | 11/2012 |
| KR | 10-1296468 B1 | 6/2013 |
| KR | 101451791 B1 | 10/2014 |
| KR | 1020140139887 A | 12/2014 |

* cited by examiner

DESICCANT COOLING SYSTEM

RELATED APPLICATION

This application claims the benefit of Korean Patent Application No. 10-2014-0164432, filed on Nov. 24, 2014, in the Korean Intellectual Property Office, the disclosure of which is incorporated herein in its entirety by reference.

BACKGROUND

1. Field

One or more exemplary embodiments relate to a desiccant cooling system, and more particularly, to a desiccant cooling system that produces cooling water by using a cooling output of a desiccant cooler and cools a water cooled condenser in a vapor compression cooling device by using the produced cooling water.

2. Description of the Related Art

Generally, desiccant cooling systems according to the related art include a desiccant dehumidifier regenerated by absorbing heat so that an outside air passes through the desiccant dehumidifier and a low-humidity state can be formed and air in the low-humidity state passes through a sensible rotor or a regenerative evaporation cooler again, is changed into a low-temperature low-humidity state, and is supplied to an indoor space.

In the desiccant cooling systems, desiccant-cooled air is produced by an integrated device and is supplied to an indoor space. The integrated device is installed in a machine compartment, and the desiccant-cooled air is supplied to the indoor space through a duct. Thus, when the desiccant cooling systems according to the related art are used in an office or a residential building, a separate duct to connect the integrated device and the indoor space should be additionally installed in the building, and thus, the installation cost, duct noise, and blowing power increase.

SUMMARY

One or more exemplary embodiments include a desiccant cooling system that produces cooling water by using a cooling output of a desiccant cooler and cools a water cooled condenser of a vapor compression cooling device by using the produced cooling water.

Additional aspects will be set forth in part in the description which follows and, in part, will be apparent from the description, or may be learned by practice of the presented embodiments.

According to one or more exemplary embodiments, a desiccant cooling system includes: a desiccant cooler including a desiccant cooling path through which air introduced from the outside passes, a desiccant dehumidifier on the desiccant cooling path to pass through air and remove humidity of the air, and a water cooling portion cooling cooling water by using the low-humidity air that has passed through the desiccant dehumidifier; and a vapor compression cooling device including a water cooled condenser disposed to be cooled by the cooling water cooled by the water cooling portion so as to condense a refrigerant flowing inside the water cooled condenser, wherein the refrigerant is circulated in the water cooled condenser.

The desiccant cooler may further include a regeneration path through which the air introduced from the outside passes, wherein one side of the desiccant dehumidifier is disposed on the desiccant cooling path, and the other side of the desiccant dehumidifier is disposed on the regeneration path, and the desiccant dehumidifier includes a rotation shaft rotating the desiccant dehumidifier in a direction across the desiccant cooling path and the regeneration path to thereby rotate the desiccant dehumidifier with respect to the rotation shaft so that the one side and the other side of the desiccant dehumidifier respectively located on the desiccant cooling path and the regeneration path are changed.

The water cooling portion may include: a latent heat exchanger configured to cool the cooling water by receiving the cooling water used to cool the water cooled condenser and transfer the cooled cooling water to the water cooled condenser; and an evaporation water injector configured to inject evaporation water into the latent heat exchanger.

The water cooling portion may further include a sensible heat exchanger at an upper stream side of the desiccant cooling path than the evaporation water injector so as to divide and pass through a part of the cooling water transferred to the water cooled condenser from the latent heat exchanger.

The cooling water supplied from the latent heat exchanger to the sensible heat exchanger may have a thermal capacity corresponding to a thermal capacity of the low-humidity air passed through one side of the desiccant dehumidifier.

About ¼ to about ⅓ of the cooling water cooled by passing through the latent heat exchanger may be divided to the sensible heat exchanger.

The water cooling portion may include: a dry channel through which dry air passed through the desiccant dehumidifier passes; a wet channel through which the air passed through the dry channel is recovered and discharged to the outside; an evaporation water injector configured to inject the evaporation water in the wet channel; and a cooling water pipe in which the cooling water introduced from the water cooled condenser is cooled and is again transferred to the water cooled condenser.

The desiccant cooler may further include: a process inlet port placed at one side of the desiccant cooling path and configured to draw our air of an outdoor space into the desiccant cooling path; a process outlet port placed at the other side of the desiccant cooling path and configured to discharge the air passed through the water cooling portion to the outside; and filters configured to filter various foreign substances or bacteria around at least one of the process inlet port and the process outlet port.

The desiccant cooler may further include: a regeneration inlet port placed at one side of the regeneration path and configured to supply air from an outdoor space; a regeneration outlet port placed at the other side of the regeneration path and configured to discharge the air passed through the desiccant dehumidifier to the outside; and filters configured to filter various foreign substances or bacteria around at least one of the regeneration inlet port and the regeneration outlet port.

The desiccant cooling system may further include a heating device at an upstream side of the desiccant dehumidifier within the regeneration path and configured to heat the air before the air passes through the desiccant dehumidifier.

The heating device may be a heating coil that heats by electricity.

The heating device may be a hot water heat exchanger.

The desiccant cooler may further include a ventilation air supply port on the desiccant cooling path and configured to supply a part of the air passed through the sensible heat exchanger to an indoor space.

The desiccant cooler may further include a ventilation air supply port on the desiccant cooling path and configured to supply a part of the air passed through the dry channel to the indoor space.

The desiccant cooler may further include a ventilation introduction port on the desiccant cooling path and configured to introduce the air in the indoor space between the sensible heat exchanger and the latent heat exchanger.

The desiccant cooler may further include an introduction port for exclusive use of ventilation along the regeneration path and configured to introduce the air in the indoor space between the regeneration inlet port and the desiccant dehumidifier.

The desiccant cooler may further include an air supply port for exclusive use of ventilation along the desiccant cooling path and configured to supply a part of the air passed through the desiccant dehumidifier to the indoor space.

The desiccant cooler may be further configured to ventilate the indoor space by stopping an operation of the water cooling portion.

According to one or more exemplary embodiments, a desiccant cooling system includes: a desiccant cooler including a desiccant cooling path through which air introduced from the outside passes, a desiccant dehumidifier disposed on the desiccant cooling path and allowing air to pass through and removing humidity of the air, and a regeneration vapor cooling portion configured to cool a refrigerant via a low-humidity air that passed through the desiccant dehumidifier; and a vapor compression cooling device comprising a compressor configured to compress the refrigerant, an expansion valve configured to expand the refrigerant condensed by the regenerative evaporative cooling portion, and an evaporator configured to evaporate the refrigerant expanded by the expansion valve and transfer the refrigerant to the compressor.

The regenerative evaporative cooling portion may include: a dry channel through which a dry air passed through the desiccant dehumidifier passes; a wet channel through which the air passed through the dry channel is recovered and discharged to the outside; an evaporation water injector configured to inject the evaporation water in the wet channel; and a refrigerant pipe in which the refrigerant introduced from the compressor is cooled and transferred to the expansion valve.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Figure 1:
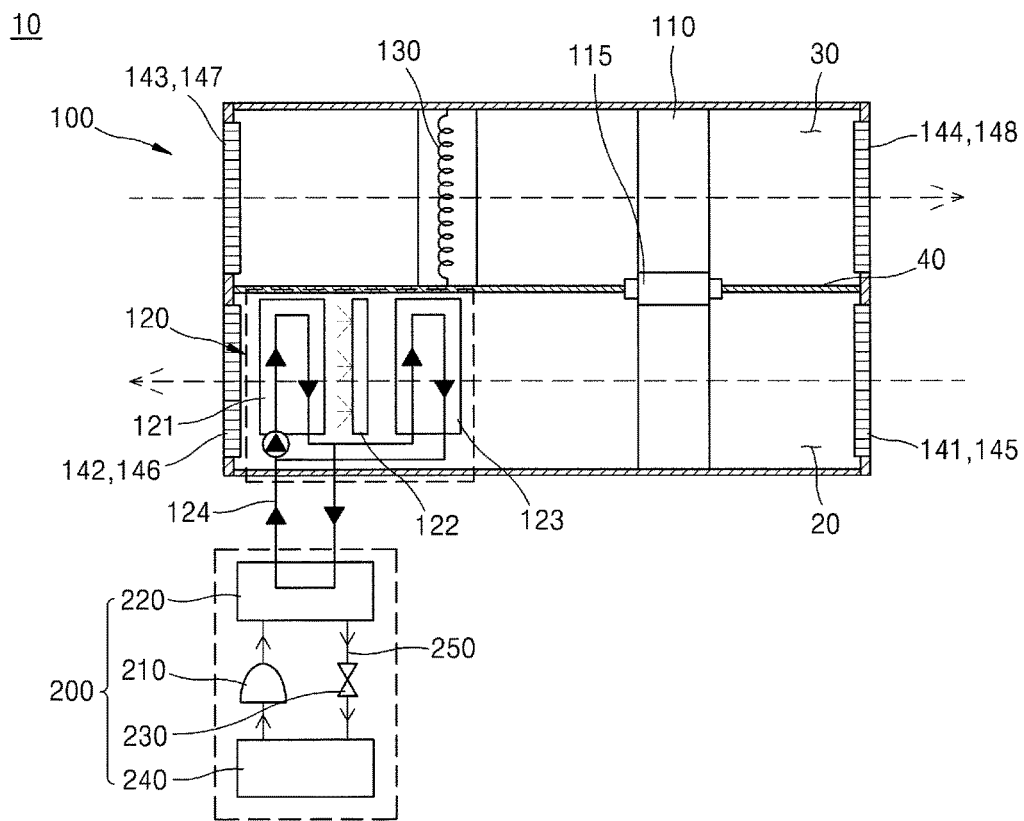
FIG. 1 is a conceptual view schematically illustrating a desiccant cooling system according to an exemplary embodiment.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the exemplary embodiments are merely described below, by referring to the figures, to explain aspects of the present description. As used herein, the term "and/or" includes any and all combinations of one or more of the associated listed items. Expressions such as "at least one of," when preceding a list of elements, modify the entire list of elements and do not modify the individual elements of the list.

Figure 2:
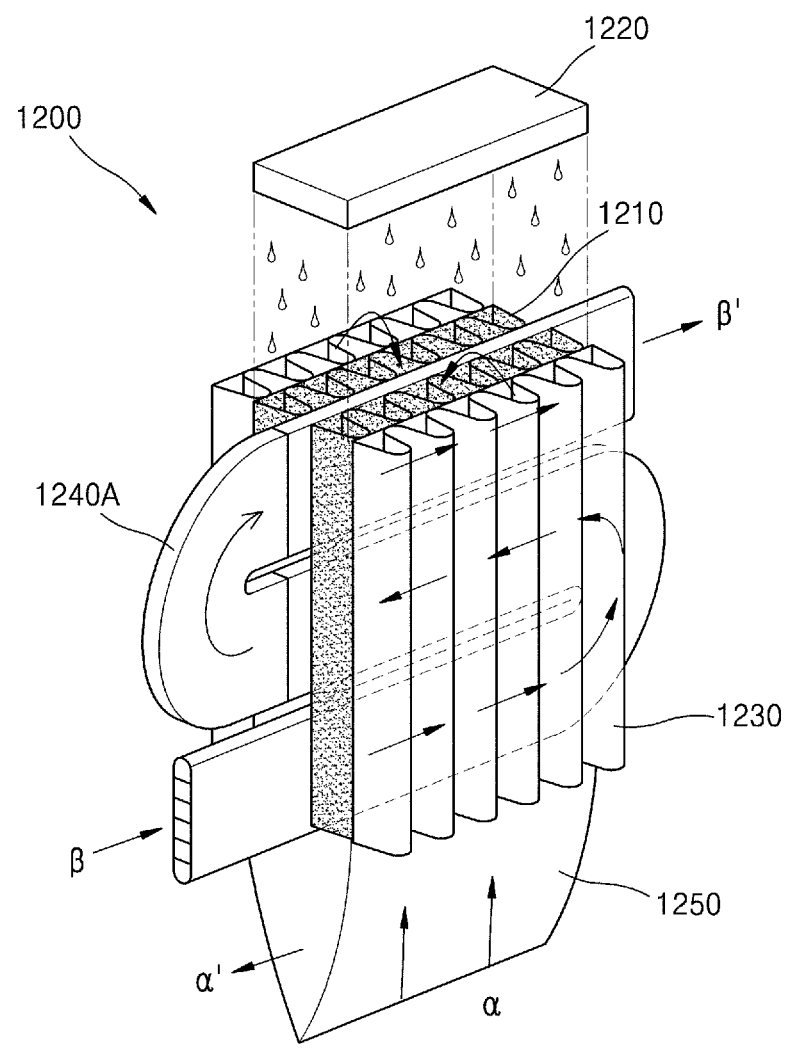
FIG. 2 is a view of a case where a water cooling portion of FIG. 1 is a regenerative evaporative cooler.

FIG. 1 is a conceptual view schematically illustrating a desiccant cooling system according to an exemplary embodiment, and FIG. 2 is a view of a case where a water cooling portion of FIG. 1 is a regenerative evaporative cooler.

First, referring to FIG. 1, a desiccant cooling system 10 includes a desiccant cooler 100 and a vapor compression cooling device 200. The desiccant cooler 100, an inside of which is partitioned by a barrier wall 40 into a desiccant cooling path 20 and a regeneration path 30, includes a desiccant dehumidifier 110 and a water cooling portion 120, and the vapor compression cooling device 200 includes a compressor 210, a water cooled condenser 220, an expansion valve 230, and an evaporator 240.

The desiccant cooling path 20 and the regeneration path 30 are formed in the desiccant cooler 100, as described above. The desiccant cooler 100 includes the desiccant dehumidifier 110 having one side disposed on the desiccant cooling path 20 and the other side disposed on the regeneration path 30, and the water cooling portion 120 that passes through the desiccant dehumidifier 110 on the desiccant cooling path 20 and cools cooling water that flows through a cooling water pipe 124 by using low-humid air from which humidity is removed.

Furthermore, the desiccant cooler 100 includes a process inlet port 141 that is placed at an upstream side of the desiccant cooling path 20 and inhales air from an outdoor space into the desiccant cooling path 20, and a process outlet port 142 that is placed at a downstream side of the desiccant cooling path 20 and discharges the air passed through the water cooled condenser 120 toward the outside. Also, the desiccant cooler 100 may further include filters 145 and 146 that filter various foreign substances or bacteria around the process inlet port 141 and the process outlet port 142 or integrally with the process inlet port 141 and the process outlet port 142.

Next, the desiccant cooler 100 may further include a regeneration inlet port 143 that is placed at an upstream side of the regeneration path 30 and supplies the air from the outdoor space, and a regeneration outlet port 144 that is placed at a downstream side of the regeneration path 30 and discharges the air passed through the desiccant dehumidifier 110 toward the outside. Also, the desiccant cooler 100 may further include filters 147 and 148 that filter various foreign substances or bacteria around the regeneration inlet port 143 and the regeneration outlet port 144 or integrally with the regeneration inlet port 143 and the regeneration outlet port 144.

Also, the desiccant cooler 100 may further include a heating device 130 disposed between the desiccant dehumidifier 110 and the regeneration inlet port 143. The heating device 130 heats the air inhaled into the regeneration inlet port 143 of the regeneration path 30 up to a temperature required for regeneration of the desiccant dehumidifier 110. Various modifications of the heating device 130, such as a heating coil or a hot water heat exchanger heated by electricity, may be present.

In detail, when the hot water heat exchanger is used as the heating device 130, waste heat from various power generation facility, industrial facility, or incineration facility may be used to supply hot water. In particular, when the hot water is supplied to the hot water heat exchanger by using the waste heat in a summer season in which a cooling load is far higher than a heating load, thermal energy to be discarded may be used in cooling and thus, energy usage efficiency may be nationally maximized. In addition, the hot water may also be supplied by using solar heat, geothermal heat or gas as a heat source.

The desiccant dehumidifier 110 may have a structure including honeycomb-shaped pores formed of ceramic paper, and a desiccant, such as silica gel, is stably coated on a surface of the ceramic paper. Also, the desiccant dehumidifier 110 may be rotated by a rotation shaft 115 installed in the vicinity of the barrier wall 40 that partitions the desiccant cooler 100 into the desiccant cooling path 20 and the regeneration path 30. While a part of the desiccant dehumidifier 110 that rotates about the rotation shaft 115 passes through the desiccant cooling path 20, the desiccant dehumidifier 110 performs a desiccant function of absorbing water vapor from the air introduced through the process inlet port 141.

While a desiccant operation is performed by the desiccant dehumidifier 110 disposed on the desiccant cooling path 20, a regeneration operation of the desiccant dehumidifier 110 is performed by the air that is introduced through the regeneration inlet port 143, passes through the heating device 130, and is heated at the remaining part of the desiccant dehumidifier 110 that passes through the regeneration path 30. The remaining part of the desiccant dehumidifier 110 that undergoes the regeneration operation enters the desiccant cooling path 20 due to rotation of the rotation shaft 115, so that the desiccant dehumidifier 110 consistently performs the desiccant function.

Next, the water cooling portion 120 that is disposed at the downstream side of the desiccant cooling path 20 and cools the cooling water by using the low-humid air passed through the desiccant dehumidifier 110 at the upstream will be described in detail.

The water cooling portion 120 includes a latent heat exchanger 121 and an evaporation water injector 122. The cooling water pipe 124 through which the cooling water be cooled flows is disposed in the latent heat exchanger 121. Since the cooling water pipe 124 is connected to the water cooled condenser 220 of the vapor compression cooling device 200, the cooling water that flows into the cooling water pipe 124 circulates by making a reciprocal motion between the latent heat exchanger 121 and the water cooled condenser 220.

Next, the evaporation water injector 122 is installed to be adjacent to the latent heat exchanger 121 and injects the evaporation water into the latent heat exchanger 121. Evaporation of the evaporation water injected by the evaporation water injector 122 is promoted by the low-humid air that passes through one side of the desiccant dehumidifier 110 disposed on the desiccant cooling path 20. In this case, the evaporation water is evaporated by taking away heat of the cooling water that flows through the cooling water pipe 124 disposed in the latent heat exchanger 121, which results in lowering of the temperature of the cooling water.

Furthermore, in order to further improve the cooling effect of the cooling water, the water cooling portion 120 may further include a sensible heat exchanger 123 at an upper stream side of the desiccant cooling path 20 than the evaporation water injector 122 so as to divide and pass through a part of the cooling water flowing in the latent heat exchanger 121. The sensible heat exchanger 123 is at a downstream side of the desiccant dehumidifier 110 and firstly cools the air before the low-humidity air passed through one side of the desiccant dehumidifier 110 is introduced into the latent heat exchanger 121 via the evaporation water injector 122.

When the low-humid air introduced into the sensible heat exchanger 123 from the desiccant dehumidifier 110 is firstly cooled, the cooling water may be cooled down to a lower temperature at the latent heat exchanger 121. Also, a water flow rate about one-fourth to one-third of the flow rate from the latent heat exchanger is enough to be supplied to the sensible heat exchanger 123. Thus, the remaining about ⅔ to about ¾ of the cooling water except for the part of the cooling water supplied to the sensible heat exchanger 123 may be supplied to the water cooled condenser 220 and may be used to cool the water cooled condenser 220.

In this case, the latent heat exchanger 121, the sensible heat exchanger 123, and the water cooled condenser 220 are connected to each other by using the cooling water pipe 124 and constitute a circulation cycle. In the circulation cycle, the cooling water circulates the latent heat exchanger 121, the sensible heat exchanger 123, and the water cooled condenser 220 along the cooling water pipe 124 and supplies the cooling water to the water cooled condenser 220.

Next, the vapor compression cooling device 200 having the same configuration as that of an electric air conditioner according to the related art includes a compressor 210 that compresses the refrigerant, the water cooled condenser 220 that condenses the refrigerant compressed by the compressor 210, an expansion valve 230 that expands the refrigerant condensed by the water cooled condenser 220, and an evaporator 240 that evaporates the refrigerant expanded by the expansion valve 230 and then transfers the refrigerant to the compressor 210.

In this case, the compressor 210, the water cooled condenser 220, the expansion valve 230, and the evaporator 240 are connected to a refrigerant pipe 250 and constitute one cooling cycle. In one cooling cycle, the compressor 210, the water cooled condenser 220, the expansion valve 230, and the evaporator 240 are circulated along the refrigerant pipe 250 and supplies cooling into the indoor space.

Here, the water cooled condenser 220 of the vapor compression cooling device 200 is connected to the water cooling portion 120 through the cooling water pipe 124, as described above, and is cooled by the cooling water that passes through the water cooling portion 120 and is cooled.

The cooling water that is used to cool the water cooled condenser 220 is transferred to the water cooling portion 120 through the cooling water pipe 124.

The water cooling portion 120 may be configured as a regenerative evaporative cooler 1200, as illustrated in FIG. 2.

Referring to FIG. 2, a regenerative evaporative cooler 1200 may include a dry channel 1230 through which the dry air passed through the desiccant dehumidifier 110 passes, a wet channel 1210 through which the air passed through the dry channel 1230 is recovered and discharged to the outside, an evaporation water injector 1220 that injects the evaporation water in the wet channel 1210, and a cooling water pipe 1240A in which the cooling water introduced from the water cooled condenser 220 is cooled and flows again into the water cooled condenser 220.

In detail, the dry air passed through the desiccant dehumidifier 110 enters an inlet of the dry channel 1230 in a direction of reference character α, is delivered at the upper end of the dry channel 1230 to the wet channel 1210 in an opposite direction to α, and is discharged in a direction of reference character α'. The cooling water from the water cooled condenser 220 enters the cooling water pipe 1240A in a direction of reference character β. The cooling water that enters the cooling water pipe 1240A is delivered along the cooling water pipe 1240A, is cooled by the evaporative cooling effect of the wet channel 1210, is discharged in a direction of reference character β' and is again transferred to the water cooled condenser 220.

The refrigerant pipe 250 of the vapor compression cooling device 200 instead of the cooling water pipe 1240A of the regenerative evaporative cooler 1200 may be disposed to pass through the regenerative evaporative cooler 1200. Since this case is shown in FIG. 3, subsequently, a structure of the desiccant cooling system 11 that may cool the refrigerant circulating in the vapor compression cooling device 200 instead of the cooling water will be described in detail with reference to FIG. 3.

Figure 3:
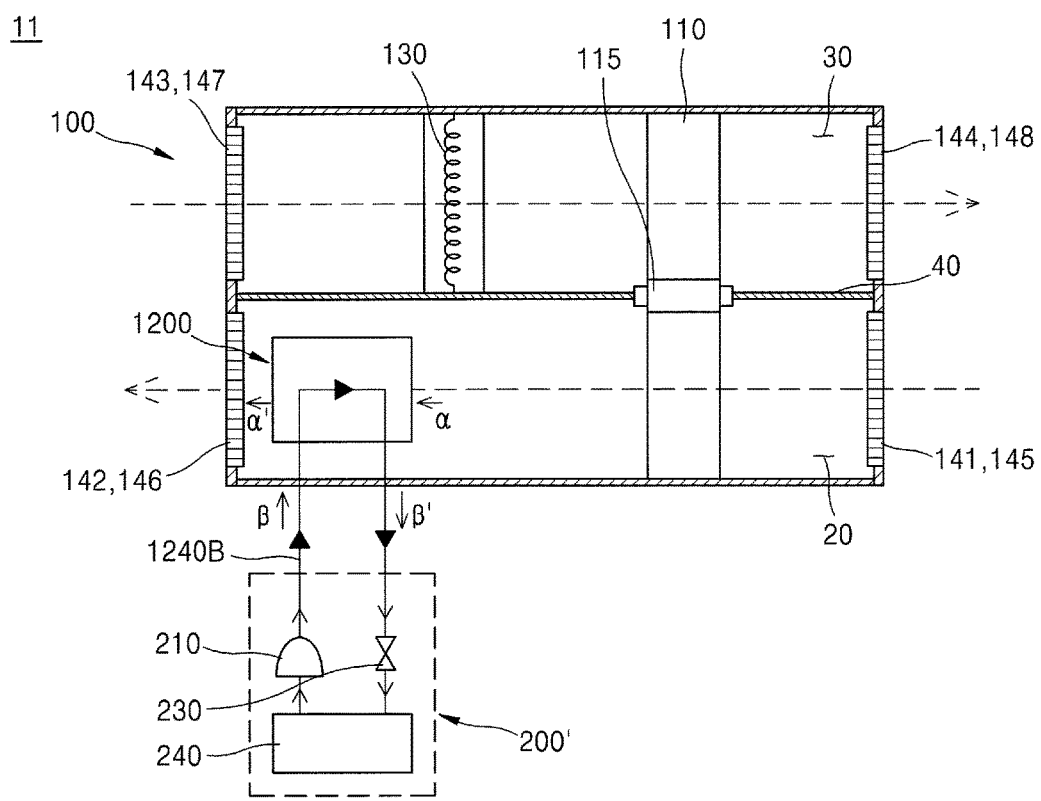
FIG. 3 is a conceptual view schematically illustrating a desiccant cooling system according to another exemplary embodiment.

FIG. 3 is a conceptual view schematically illustrating a desiccant cooling system according to another exemplary embodiment.

In the desiccant cooling system 11 illustrated in FIG. 3, the regenerative evaporative cooler 1200 of FIG. 2 is disposed at the downstream side of the desiccant cooling path 20 of the desiccant cooler 100. Here, although not shown in FIG. 3, an internal structure of the regenerative evaporative cooler 1200 is the same as that of FIG. 2. Thus, as illustrated in FIG. 2, the dry air passed through the desiccant dehumidifier 110 enters the inlet of the dry channel 1230 of the regenerative evaporative cooler 1200 along the direction of reference numeral α, is delivered to the guide portion 1250 through the wet channel 1210 and is discharged in the direction of reference numeral α'.

As described above, a refrigerant pipe 1240B instead of the cooling water pipe 1240A shown in FIG. 2 may be installed in the regenerative evaporative cooler 1200 shown in FIG. 3. Thus, the refrigerant transferred from the compressor 210 of a vapor compression cooling device 200' is introduced into a regenerative evaporative cooler 1200B in the direction of reference character β through the refrigerant pipe 1240B, is delivered along the refrigerant pipe 1240B, is cooled by the evaporation cooling effect of the wet channel 1210, flows in the direction of reference character 62', and is transferred to the expansion valve 230 of the vapor compression cooling device 200'.

This method is used to cool the refrigerant that is evaporated by the evaporator 240 and produces cooling with evaporation heat thereof, instead of improving cooling effect by reducing the temperature of the cooling water that cools the water cooled condenser 220. In the method, like in a method of cooling the cooling water passed through the water cooled condenser 220 described above, the desiccant cooling system 11 that may improve the cooling effect of the vapor compression cooling device 200 may be provided.

Next, the effect of cooling the water cooled condenser 220 of the vapor compression cooling device 200 by using cooling water produced by the water cooling portion 120 will be described with reference to FIGS. 4 through 6.

Figure 4:
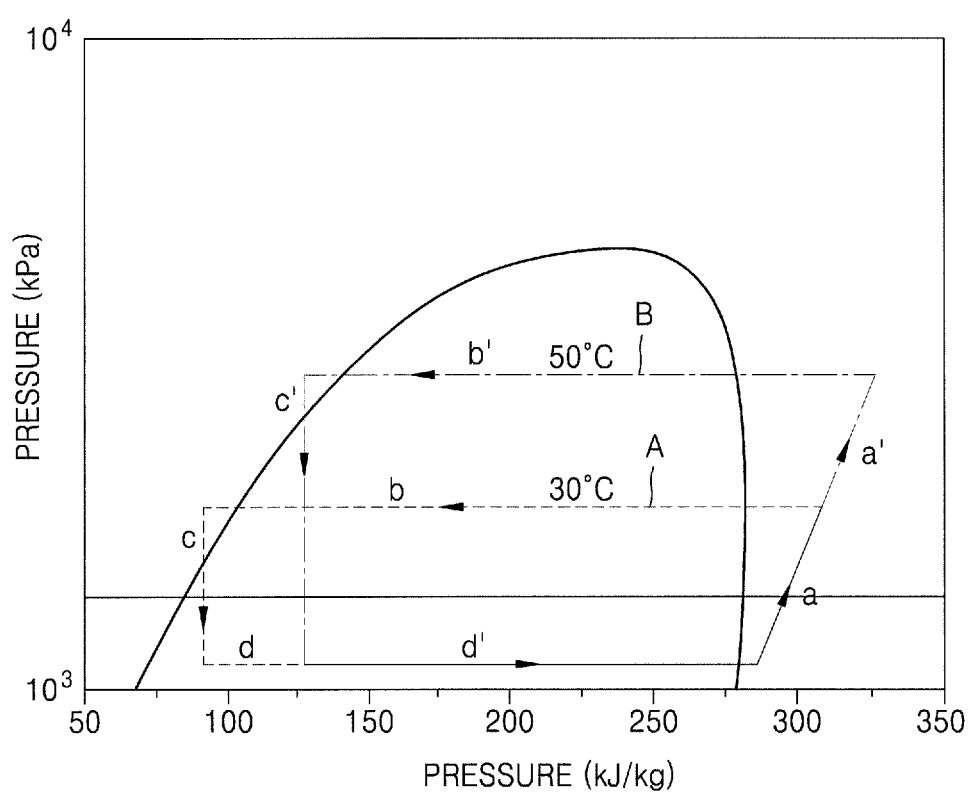
FIG. 4 is a graph showing pressure enthalpy (P-h) mollier diagram of a refrigerant (R410A) that circulates in a refrigerant circuit of FIG. 1.
Figure 5:
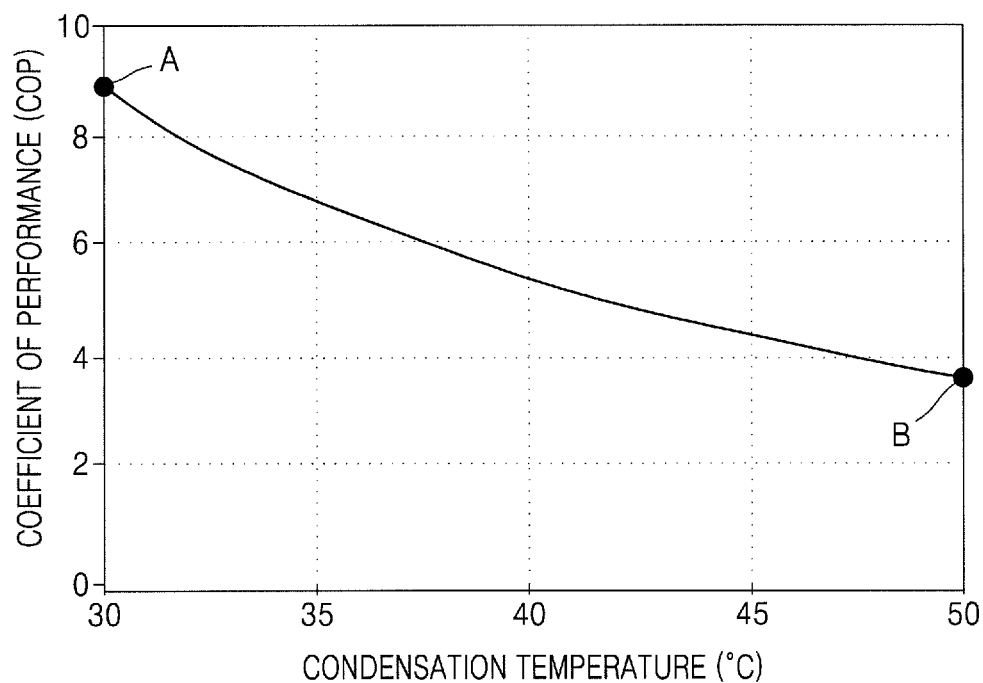
FIG. 5 is a graph showing a change in coefficients of performance (COPs) of a vapor compression cooling device according to a change in condensation temperatures of the water cooled condenser of FIG. 1.
Figure 6:
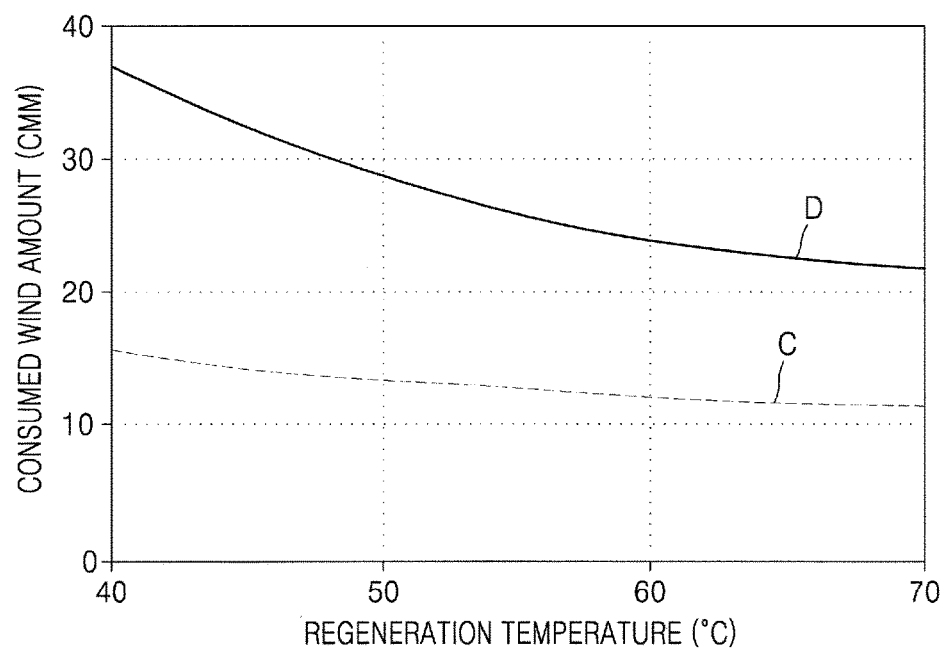
FIG. 6 is a graph showing the air flow rate required to supply 10 kW of a cooling output according to a change in regeneration temperatures of a desiccant dehumidifier of FIG. 1.

FIG. 4 is a graph showing pressure enthalpy (P-h) mollier diagram of a refrigerant (R410A) that circulates in a refrigerant circuit of FIG. 1, and FIG. 5 is a graph showing a change in coefficients of performance (COPs) of a vapor compression cooling device according to a change in condensation temperatures of the water cooled condenser of FIG. 1, and FIG. 6 is a graph showing the air flow rate required to supply 10 kW of a cooling output according to a change in regeneration temperatures of a desiccant dehumidifier of FIG. 1.

First, referring to FIG. 4, reference character A is a graph showing a pressure change caused by enthalpy of the vapor compression cooling device 200 when the condensation temperature of the water cooled condenser 220 is 30° C., and reference numeral B is a graph showing a pressure change caused by enthalpy of the vapor compression cooling device 200 when the condensation temperature of the water cooled condenser 220 is 50° C. Reference characters a and a' represent a state in which the refrigerant is compressed by passing through the compressor 210, reference characters b and b' represent a state in which the compressed refrigerant is condensed by passing through the water cooled condenser 220, reference characters c and c' represent a state in which the condensed refrigerant is expanded by passing through the expansion valve 230, and reference characters d and d' represent a state in which the expanded refrigerant is evaporated by passing through the evaporator 240.

Power consumed by the compressor 210 required for the cooling cycle may be determined by referring to reference characters a and a', and a cooling capacity of the vapor compression cooling device 200 may be checked according to lengths of reference character d and d'. That is, the length of reference character a' that is greater than the length of reference numeral a means that the power consumed by the compressor 210 when the condensation temperature of the water cooled condenser 220 is 50° C. (reference numeral B) is greater than that of the compressor 210 when the condensation temperature of the water cooled condenser 220 is 30° C. (reference character A), and the length of reference character d that is greater than the length of reference character d' means that the cooling capacity of the vapor compression cooling device 200 when the condensation temperature of the water cooled condenser 220 is 30° C. (reference numeral A) is greater than that of the vapor compression cooling device 200 when the condensation temperature of the water cooled condenser 220 is 50° C. (reference character B).

Thus, when the condensation temperature of the water cooled condenser 220 is 30° C. (reference character A), more cooling capacity (reference character d) may be obtained with less input (reference character a) of the compressor 210 compared to the case where the condensation temperature of the water cooled condenser 220 is 50° C. (reference character B).

In more detail, an air-cooling vapor compression cooling device (not shown) according to the related art cools a condenser (not shown) by using the outdoor air (by not using the cooled air supplied by the desiccant cooling device 100, like in an embodiment. In this case, when the outdoor air is at 35° C. and has 40% RH, the condensation temperature of the condenser (not shown) using air-cooling is approximately 50° C. Thus, the air-cooling vapor compression cooling device (not shown) that uses the outdoor air to cool the condenser (not shown) has a shape of the cooling cycle shown in reference numeral B of FIG. 3.

The temperature of the cooling water obtained by the water cooling portion 120 is about 20° C. When the water cooled condenser 220 of the vapor compression cooling device 200 is cooled using the cooling water obtained by the water cooling portion 120, the condensation temperature of the water cooled condenser 220 may be lowered by about 20° C. compared to the air-cooling vapor compression cooling device (not shown) according to the related art.

Thus, when the cooling water obtained by the water cooling portion 120 is used to cool the water cooled condenser 220 of the vapor compression cooling device 200, a shape of the cooling cycle shown in reference numeral A of FIG. 3. This means that a larger cooling output may be obtained with less compressor input.

Next, a change of cooling cycle efficiency, i.e., a coefficient of performance (COP) of the vapor compression cooling device 200 according to a condensation temperature change of the water cooled condenser 220 will be described with reference to FIG. 5.

Referring to FIG. 5, when a refrigerant is R410A, an evaporation temperature is 10° C., a temperature of overheating is 5° C., a temperature of subcooling is 5° C., the efficiency of a compressor is 0.7 and a condensation temperature is 50° C. (B), a COP of the air-cooling vapor compression cooling device (not shown) according to the related art is 3.8. When, according to an embodiment, the cooling water obtained by the water cooling portion 120 is used to cool the water cooled condenser 220 (reference numeral A), for example, when the condensation temperature is 30° C., the COP of the vapor compression cooling device 200 is 8.8, which is an increase more than twice compared to the COP of 3.8 of the air-cooling vapor compression cooling device (not shown).

Next, a change of an air flow rate for supplying 10 kW of a cooling output according to a change of a regeneration temperature of the desiccant dehumidifier 110 will be briefly described with reference to FIG. 6.

Referring to FIG. 6, reference character C represents a case where a cooling agent is supplied to the desiccant cooling system 10 according to an exemplary embodiment, and reference character D represents a case where a cooling agent is supplied to a hybrid desiccant cooling system (not shown) according to the related art. In both reference characters C and D, as the regeneration temperature of the desiccant dehumidifier 110 rises, the required air flow rate may be reduced. However, in particular, in the case of reference character C, that is, the desiccant cooling system 10 according to an exemplary embodiment, the required air flow rate compared to the hybrid desiccant cooling system (not shown) according to the related art is about half.

This means that, in an exemplary embodiment, as described above, the cooling water cooled by the water cooling portion 120 is used to cool the water cooled condenser 220 so that cooling performance may be improved and thus the same cooling output may be obtained with less air flow rate than that of the hybrid desiccant cooling system (not shown) according to the related art.

In this way, when the required air flow rate is small, capacities of main components of the desiccant cooling system 10 including the desiccant dehumidifier 110 are reduced and thus, the consumed power and regeneration energy are reduced.

Next, a desiccant cooling system 12 that may supply air produced by the desiccant cooling device 100 directly into an indoor space 15 for the purpose of ventilation as necessary will be described with reference to FIG. 7.

Figure 7:
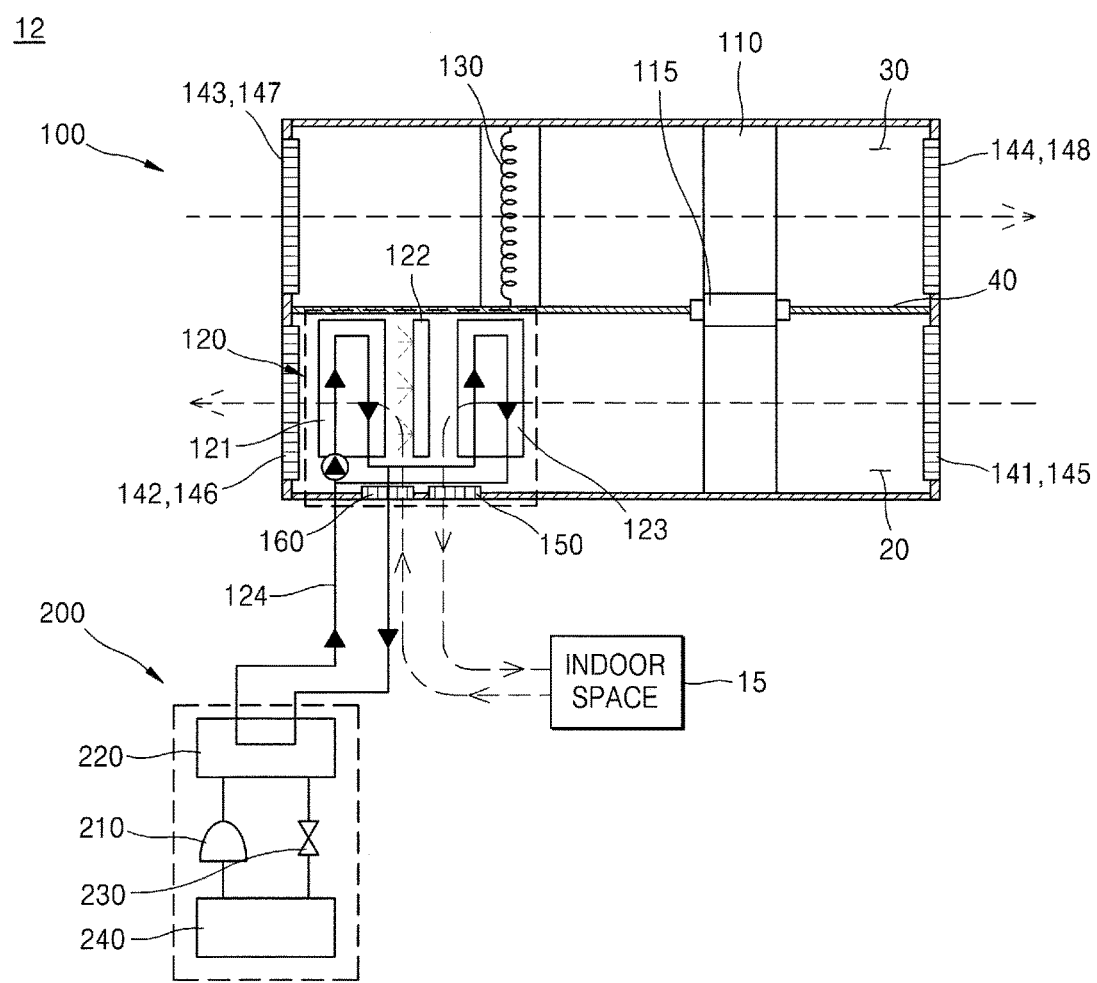
FIG. 7 is a conceptual view schematically illustrating a desiccant cooling system according to another exemplary embodiment.

FIG. 7 is a conceptual view schematically illustrating a desiccant cooling system according to another exemplary embodiment.

Referring to FIG. 7, a desiccant cooler 100 may further include a ventilation air supply port 150 that is placed on a desiccant cooling path 20 and supplies a part of air passed through a sensible heat exchanger 123 into the indoor space 15 and a ventilation introduction port 160 that is placed on the desiccant cooling path 20 and introduces the air in the indoor space 15 between the sensible heat exchanger 123 and the latent heat exchanger 121.

A desiccant cooling system 12 according to another exemplary embodiment has a structure in which fresh air may be supplied into the indoor space 15 so as to perform indoor ventilation during a cooling operation, supplies a part of the air dehumidified and cooled by the desiccant dehumidifier 110 and the sensible heat exchanger 123 into the indoor space 15, and the air recovered from the indoor space 15 is introduced again immediately in front of the latent heat exchanger 121 and is used to cool the latent heat exchanger 121. In this case, a ventilation air flow rate required for a common house is about 4 to 5 CMM, and about 30 to 40% of the total air flow rate, 12 CMM produced from the desiccant cooling system 10 having the cooling capacity of 10 kW may be used for ventilation.

In detail, the desiccant cooling system 12 according to another exemplary embodiment of FIG. 7 may supply cooling into the indoor space 15 and may utilize characteristics, such as ventilation, deodorization, and antibacterial effect which are large advantages of the desiccant cooler 100. Also, only a small air flow rate needs to be supplied for the purpose of ventilation. Thus, a ventilation duct that has been already installed in the indoor space 15 may be intactly utilized without installing a separate duct.

In this case, the air introduced again immediately in front of the latent heat exchanger 121 from the indoor space 15 is air discharged from the indoor space 15 and has a higher wet-bulb temperature than that of air that is dehumidified and cooled by the desiccant dehumidifier 110 and the sensible heat exchanger 123. However, even in this case, if the temperature of air in the indoor space 15 is 27° C. and humidity is 50% RH, an increase in the wet-bulb temperature of an inlet of the latent heat exchanger 121 is merely 1° C. and thus, there is no large influence on a cooling output of the water cooling portion 120.

Hereinafter, a structure of a desiccant cooling system 13 that may operate with an energy recovering ventilation device during the change of seasons, such as spring and fall, except for a cooling operation will be described with reference to FIG. 8.

Figure 8:
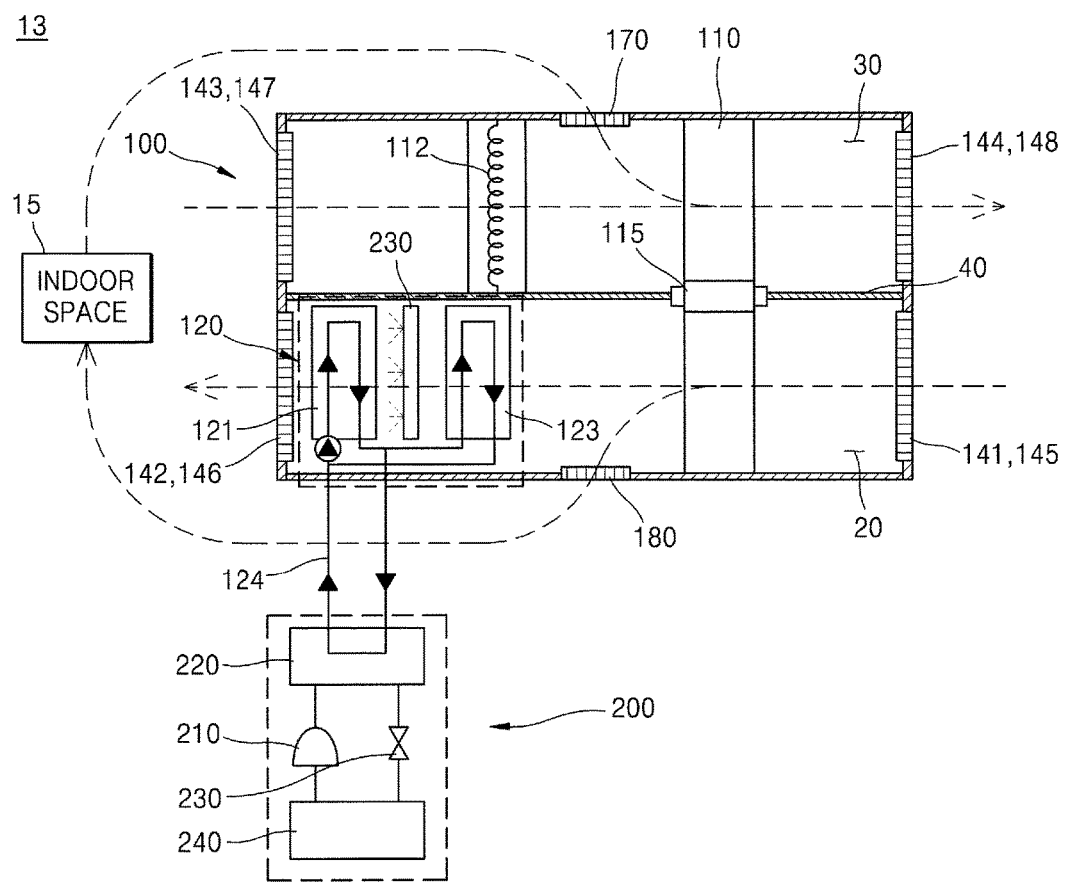
FIG. 8 is a conceptual view schematically illustrating a desiccant cooling system according to another exemplary embodiment.

FIG. 8 is a conceptual view schematically illustrating a desiccant cooling system according to another exemplary embodiment.

Referring to FIG. 8, a desiccant cooler 100 may further include an introduction port 170 for exclusive use of ventilation on a regeneration path 30, recovering air from the indoor space 15, and introducing the recovered air between a regeneration inlet port 143 and a desiccant dehumidifier 110, and an introduction port 180 for exclusive use of ventilation on a desiccant cooling path 20 and supplying the air passed through the desiccant dehumidifier 110 to the indoor space 5.

A desiccant cooling system 13 according to another exemplary embodiment operates for the exclusive use of ventilation when cooling is not required. In this case, a water cooled condenser 120 of the desiccant cooler 100 and a vapor compression cooling device 200 do not operate, and the desiccant dehumidifier 110 does not perform a desiccant function and operates as a total heat exchanger.

In detail, a ventilation operation is performed as below. First, the air recovered from the indoor space 15 is introduced into the introduction port 170 for the exclusive use of ventilation, passes through the desiccant dehumidifier 110 along the regeneration path 30 and transfers sensible heat and latent heat of the air to the desiccant dehumidifier 110. Next, the sensible heat and the latent heat transferred to the desiccant dehumidifier 110 from the air recovered from the indoor space 15 in this way are transferred to an outside air from the process inlet port 141 according to rotation of the desiccant dehumidifier 110, are transferred to outside air passed through the desiccant cooling path 20, and the outside air to which the sensible heat and the latent heat are transferred, is introduced into the indoor space 15 through the air supply port 180 for the exclusive use of ventilation.

Thus, when cooling is not required, the desiccant cooler 100 of the desiccant cooling system 13 may be used as an energy recovery ventilation device. Since cooling is not required, in this case, of course, the vapor compression cooling device 200 does not operate.

As described above, according to the one or more of the above exemplary embodiments, a cooling water is produced by using a cooling output of a desiccant cooler, and the produced cooling water is used to cool a water cooled condenser of a vapor compression cooling device so that a fan power of the desiccant cooler may be reduced and simultaneously the efficiency of the vapor compression cooling device may be increased. In addition, cooling may be supplied into an indoor space without additionally installing a separate duct in a desiccant cooling system according to the related art.

It should be understood that the exemplary embodiments described therein should be considered in a descriptive sense only and not for purposes of limitation. Descriptions of features or aspects within each embodiment should typically be considered as available for other similar features or aspects in other embodiments.

While one or more exemplary embodiments have been described with reference to the figures, it will be understood by those of ordinary skill in the art that various changes in form and details may be made therein without departing from the spirit and scope of the inventive concept as defined by the following claims.

What is claimed is:

1. A desiccant cooling system comprising:
   a desiccant cooler including a desiccant cooling path through which air passes,
   a desiccant dehumidifier on the desiccant cooling path to pass through air and remove humidity of the air, and
   a water cooling portion disposed in a lower stream side of the desiccant dehumidifier to cool water by using the low-humidity air that has been dehumidified by passing through the desiccant dehumidifier; and
   a vapor compression cooling device including a compressor configured to compress a refrigerant, a water cooled condenser disposed to be cooled by the cooling water cooled by the water cooling portion so as to condense the refrigerant that is compressed by the compressor and flows inside the water cooled condenser, and an expansion valve configured to expand the refrigerant condensed by the water cooled condenser, and an evaporator configured to evaporate the refrigerant expanded by the expansion valve and transfer the refrigerant to the compressor,
   wherein the refrigerant is circulated in the water cooled condenser,
   the evaporator is disposed outside the desiccant cooler in order to supply cooling an indoor space, and
   the air of the desiccant cooling path is discharged from the desiccant cooling path toward outside of the desiccant cooler after passing through the water cooling portion.

2. The desiccant cooling system of claim 1, wherein the desiccant cooler further includes a regeneration path through which the air passes, wherein one side of the desiccant dehumidifier is disposed on the desiccant cooling path, and the other side of the desiccant dehumidifier is disposed on the regeneration path, and the desiccant dehumidifier includes a rotation shaft rotating the desiccant dehumidifier in a direction across the desiccant cooling path and the regeneration path to thereby rotate the desiccant dehumidifier with respect to the rotation shaft so that the one side and the other side of the desiccant dehumidifier respectively located on the desiccant cooling path and the regeneration path are changed.

3. The desiccant cooling system of claim 1, wherein the water cooling portion comprises:
   a latent heat exchanger configured to cool the cooling water by receiving the cooling water used to cool the water cooled condenser and transfer the cooled cooling water to the water cooled condenser; and
   an evaporation water injector configured to inject evaporation water into the latent heat exchanger.

4. The desiccant cooling system of claim 3, wherein the water cooling portion further comprises a sensible heat exchanger at an upper stream side of the desiccant cooling path than the evaporation water injector so as to divide and pass through a part of the cooling water transferred to the water cooled condenser from the latent heat exchanger.

5. The desiccant cooling system of claim 4, wherein the cooling water supplied from the latent heat exchanger to the sensible heat exchanger has a thermal capacity corresponding to a thermal capacity of the low-humidity air passed through one side of the desiccant dehumidifier.

6. The desiccant cooling system of claim 4, wherein from ¼ to ⅓ of the cooling water cooled by passing through the latent heat exchanger is divided to the sensible heat exchanger.

7. The desiccant cooling system of claim 4, wherein the desiccant cooler further comprises a ventilation air supply port on the desiccant cooling path and configured to supply a part of the air passed through the sensible heat exchanger to an indoor space.

8. The desiccant cooling system of claim 7, wherein the desiccant cooler further comprises a ventilation introduction port on the desiccant cooling path and configured to introduce the air in the indoor space between the sensible heat exchanger and the latent heat exchanger.

9. The desiccant cooling system of claim 1, wherein the water cooling portion comprises:
   a dry channel through which dry air passed through the desiccant dehumidifier passes;
   a wet channel through which the air passed through the dry channel is recovered and discharged to the outside;

an evaporation water injector configured to inject the evaporation water in the wet channel; and a cooling water pipe in which the cooling water introduced from the water cooled condenser is cooled and is again transferred to the water cooled condenser.

10. The desiccant cooling system of claim 9, wherein the desiccant cooler further comprises a ventilation air supply port on the desiccant cooling path and configured to supply a part of the air passed through the dry channel to the indoor space.

11. The desiccant cooling system of claim 1, wherein the desiccant cooler further comprises:
- a process inlet port placed at one side of the desiccant cooling path and configured to draw our air of an outdoor space into the desiccant cooling path;
- a process outlet port placed at the other side of the desiccant cooling path and configured to discharge the air passed through the water cooling portion to the outside; and
- filters configured to filter various foreign substances or bacteria around at least one of the process inlet port and the process outlet port.

12. The desiccant cooling system of claim 1, wherein the desiccant cooler further comprises:
- a regeneration inlet port placed at one side of the regeneration path and configured to supply air from an outdoor space;
- a regeneration outlet port placed at the other side of the regeneration path and configured to discharge the air passed through the desiccant dehumidifier to the outside; and
- filters configured to filter various foreign substances or bacteria around at least one of the regeneration inlet port and the regeneration outlet port.

13. The desiccant cooling system of claim 12, wherein the desiccant cooler further comprises an introduction port for exclusive use of ventilation along the regeneration path and configured to introduce the air in the indoor space between the regeneration inlet port and the desiccant dehumidifier.

14. The desiccant cooling system of claim 13, wherein the desiccant cooler further comprises an air supply port for exclusive use of ventilation along the desiccant cooling path and configured to supply a part of the air passed through the desiccant dehumidifier to the indoor space.

15. The desiccant cooling system of claim 14, wherein the desiccant cooler is further configured to ventilate the indoor space by stopping an operation of the water cooling portion.

16. The desiccant cooling system of claim 1, further comprising a heating device at an upstream side of the desiccant dehumidifier within the regeneration path and configured to heat the air before the air passes through the desiccant dehumidifier.

17. The desiccant cooling system of claim 16, wherein the heating device is a heating coil that heats by electricity.

18. The desiccant cooling system of claim 16, wherein the heating device is a hot water heat exchanger.

19. A desiccant cooling system comprising:
- a desiccant cooler including a desiccant cooling path through which air passes,
- a desiccant dehumidifier disposed on the desiccant cooling path and allowing air to pass through and removing humidity of the air, and
- a regenerative vapor cooling portion disposed in a lower stream side of the desiccant dehumidifier to cool a refrigerant via a low-humidity air that has been dehumidified by passing through the desiccant dehumidifier; and
- a vapor compression cooling device comprising a compressor configured to compress the refrigerant, an expansion valve configured to expand the refrigerant condensed by the regenerative evaporative cooling portion, and
- an evaporator configured to evaporate the refrigerant expanded by the expansion valve and transfer the refrigerant to the compressor,
- wherein the air of the desiccant cooling path is discharged from the desiccant cooling path toward outside of the desiccant cooler after passing through the regenerative vapor cooling portion.

20. The desiccant cooling system of claim 19, wherein the regenerative evaporative cooling portion comprises:
- a dry channel through which a dry air passed through the desiccant dehumidifier passes;
- a wet channel through which the air passed through the dry channel is recovered and discharged to the outside;
- an evaporation water injector configured to inject the evaporation water in the wet channel; and
- a refrigerant pipe in which the refrigerant introduced from the compressor is cooled and transferred to the expansion valve.

* * * * *